US012743931B2

(12) United States Patent
Hanson

(10) Patent No.: US 12,743,931 B2
(45) Date of Patent: Sep. 22, 2026

(54) QUICK DRAW STUD

(71) Applicant: CFPH, LLC, New York, NY (US)

(72) Inventor: Joshua Hanson, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 234 days.

(21) Appl. No.: 17/329,091

(22) Filed: May 24, 2021

(65) Prior Publication Data

US 2021/0280018 A1 Sep. 9, 2021

Related U.S. Application Data

(63) Continuation of application No. 14/460,461, filed on Aug. 15, 2014, now Pat. No. 11,017,639, which is a continuation of application No. 14/163,686, filed on Jan. 24, 2014, now Pat. No. 8,814,645.

(51) Int. Cl.
*G07F 17/32* (2006.01)
*G06Q 50/34* (2012.01)

(52) U.S. Cl.
CPC ......... *G07F 17/3293* (2013.01); *G06Q 50/34* (2013.01); *G07F 17/3244* (2013.01); *G07F 17/326* (2013.01)

(58) Field of Classification Search
CPC ............. G07F 17/3293; G07F 17/3244; G07F 17/326; G06Q 50/34
See application file for complete search history.

(56) References Cited

U.S. PATENT DOCUMENTS

| | | | | |
|---|---|---|---|---|
| 5,820,460 A * | 10/1998 | Fulton | G07F 17/3293 | 463/13 |
| 6,050,568 A * | 4/2000 | Hachquet | A63F 1/00 | 463/13 |
| 6,135,885 A * | 10/2000 | Lermusiaux | G07F 17/32 | 463/16 |
| 6,378,042 B1 * | 4/2002 | Henderson | G06F 12/0802 | 711/134 |
| 7,670,222 B2 | 3/2010 | Rozkin et al. | | |
| 7,785,184 B2 | 8/2010 | Jubinville et al. | | |
| 8,814,645 B1 | 8/2014 | Hanson | | |
| 9,552,693 B1 * | 1/2017 | Reeves | G07F 17/3239 | |
| 11,017,639 B2 | 5/2021 | Hanson | | |
| 2001/0015528 A1 | 8/2001 | Wichinsky | | |
| 2002/0183105 A1 * | 12/2002 | Cannon | G07F 17/32 | 463/16 |
| 2002/0183109 A1 * | 12/2002 | McGahn | G07F 17/3211 | 463/20 |
| 2002/0185816 A1 | 12/2002 | Moody | | |

(Continued)

FOREIGN PATENT DOCUMENTS

| | | |
|---|---|---|
| CN | 1924938 | 3/2007 |
| CN | 101180106 | 5/2008 |

(Continued)

*Primary Examiner* — Jeffrey K Wong

(57) ABSTRACT

Method and system for playing a poker game that comprises receiving a wager from a player for a hand. Cards a dealt from a deck of cards either in an entirely face-up or entirely face down position. The player progressively selects cards from one or more sets of selection cards. Any selection cards that are not selected are removed. After the hand is completed, a ranking for the player's hand is determined. The player is paid an amount based on the ranking.

20 Claims, 13 Drawing Sheets

(56) References Cited

U.S. PATENT DOCUMENTS

| | | | | |
|---|---|---|---|---|
| 2003/0013522 | A1* | 1/2003 | Muir | G07F 17/3202 463/36 |
| 2003/0013531 | A1* | 1/2003 | Rowe | G07F 17/3248 463/42 |
| 2003/0018862 | A1* | 1/2003 | Karnstedt | G06F 5/065 711/156 |
| 2003/0050111 | A1* | 3/2003 | Saffari | G07F 17/3255 463/25 |
| 2003/0060276 | A1* | 3/2003 | Walker | G07F 17/3244 463/25 |
| 2003/0232638 | A1* | 12/2003 | Luciano, Jr. | G07F 17/32 463/19 |
| 2004/0038733 | A1* | 2/2004 | Walker | G07F 17/3244 463/25 |
| 2004/0172508 | A1* | 9/2004 | Nguyen | G06F 11/1666 711/162 |
| 2004/0242315 | A1 | 12/2004 | Paulsen | |
| 2005/0261995 | A1 | 11/2005 | Phelan | |
| 2006/0025206 | A1* | 2/2006 | Walker | G07F 17/32 463/20 |
| 2006/0100019 | A1* | 5/2006 | Hornik | G07F 17/32 463/42 |
| 2007/0027807 | A1 | 2/2007 | Bronstein | |
| 2007/0057464 | A1* | 3/2007 | Cockrell, Jr. | A63F 1/00 273/303 |
| 2008/0146346 | A1* | 6/2008 | Hardy | G07F 17/329 463/16 |
| 2008/0242421 | A1* | 10/2008 | Geisner | A63F 13/75 463/42 |
| 2009/0042652 | A1 | 2/2009 | Baerlocher et al. | |
| 2009/0192903 | A1 | 7/2009 | Weiss et al. | |
| 2011/0009197 | A1* | 1/2011 | Peltz | G07F 17/3246 463/46 |
| 2012/0064961 | A1* | 3/2012 | Vancura | G07F 17/3265 463/20 |
| 2012/0094743 | A1* | 4/2012 | Odom | G07F 17/3262 463/20 |
| 2012/0244946 | A1 | 9/2012 | Muir et al. | |
| 2013/0178263 | A1* | 7/2013 | Alderucci | A63F 13/80 463/11 |
| 2014/0114890 | A1* | 4/2014 | Fujimaki | G06N 20/00 706/12 |
| 2017/0092059 | A1* | 3/2017 | Nelson | G07F 17/3225 |
| 2018/0130290 | A1* | 5/2018 | Lyons | G07F 17/3209 |

FOREIGN PATENT DOCUMENTS

| | | |
|---|---|---|
| CN | 101203282 | 6/2008 |
| CN | 201832396 | 5/2011 |
| JP | 2002078843 | 3/2002 |
| WO | 2015100450 | 7/2015 |

* cited by examiner

QUICK DRAW STUD

CROSS REFERENCE TO RELATED APPLICATIONS

This application is a continuation of U.S. patent application Ser. No. 14/460,461 filed Aug. 15, 2014 which is a continuation of U.S. patent application Ser. No. 14/163,686 filed on Jan. 24, 2014 (now U.S. Pat. No. 8,814,645 issued on Aug. 26, 2014), each of which is hereby incorporated by reference herein.

BACKGROUND

The invention related to new method for electronic card games, such as poker.

DETAILED DESCRIPTION

Figure 1:
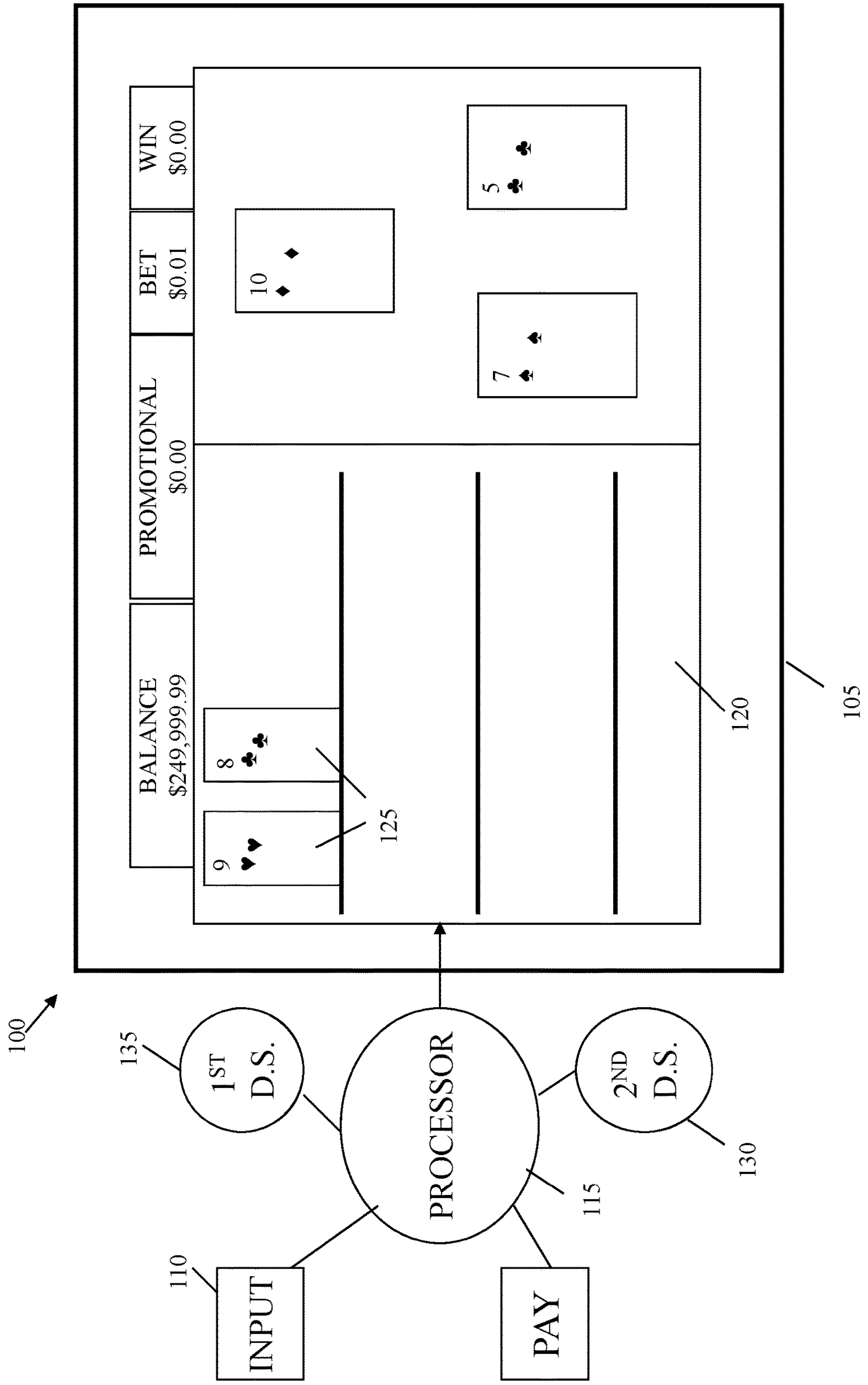
FIG. 1. shows an embodiment of a processor controlled display of a video poker game.

The following sections I-XI provide a guide to interpreting the present application.

I. TERMS

The term "product" means any machine, manufacture and/or composition of matter, unless expressly specified otherwise.

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise.

The term "variation" of an invention means an embodiment of the invention, unless expressly specified otherwise.

The term "indication" is used in an extremely broad sense. An "indication" of a thing should be understood to include anything that may be used to determine the thing.

An indication of a thing may include an electronic message that identifies the thing (e.g., an identification of a widget by a serial number affixed to the widget, an identification of a widget by one or more characteristics of the widget). An indication of a thing may include information that may be used to compute and/or look-up a thing (e.g., information identifying a machine of which a widget is a part that may be used to determine the widget). An indication of a thing may specify things that are related to the thing (e.g., characteristics of the thing, a name of the thing, a name of a thing related to the thing). An indication of a thing may not specify things that are related to the thing (e.g., a letter "a" may be an indication of a widget of a computer system that is configured to interpret the letter "a" to identify the widget). An indication of a thing may include a sign, a symptom, and/or a token of the thing. An indication, for example, may include a code, a reference, an example, a link, a signal, and/or an identifier. An indication of a thing may include information that represents, describes, and/or otherwise is associated with the thing.

A transformation of an indication of a thing may be an indication of the thing (e.g., an encrypted indication of a thing may be an indication of the thing). An indication of a thing may include the thing itself, a copy of the thing, and/or a portion of the thing. An indication of a thing may be meaningless to a thing that is not configured to understand the indication (e.g., a person may not understand that a letter "a" indicates a widget but it may nonetheless be an indication of the widget because the computer system may determine the widget from the letter "a"). It should be understood that the fact that an indication of a thing may be used to determine the thing does not mean that the thing or anything else is determined. An indication of a thing may include an indication of any number of the thing unless specified otherwise. An indication of a thing may include an indication of other things (e.g., an electronic message that indicates may things). (Indication can be used as a very broad term in claim language. For example: receiving an indication of a financial instrument.)

The term "represent" means (1) to serve to express, designate, stand for, or denote, as a word, symbol, or the like does; (2) to express or designate by some term, character, symbol, or the like; (3) to portray or depict or present the likeness of, as a picture does; or (4) to serve as a sign or symbol of.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may include or cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments may cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well.

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The terms "a", "an" and "the" refer to "one or more", unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the feature," then the phrase "the feature" should be understood to refer to the previously mentioned "a specific single feature." (It should be understood that the term "a" in "a specific single feature" refers to "one" specific single feature and not "one or more" specific single features.)

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". The phrase "based at least on" is equivalent to the phrase "based at least in part on". For example, the phrase "element A is calculated based on element B and element C" covers embodiments where element A is calculated as the product of B times C (in other words, A=B×C), embodiments where A is calculated as the sum of B plus C (in other words, A=B+C), embodiments where A is calculated as a product of B times C times D, embodiments where A is calculated as a sum of the square root of B plus C plus D times E, and so on.

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" modifies do not establish specific further limitations of the claim or otherwise restrict the meaning or scope of the claim.

The terms "e.g", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers in the range, unless expressly specified otherwise. For example, the range "1 to 10" includes the integers from 1 to 10 (e.g., 1, 2, 3, 4, . . . 9, 10) and non-integers (e.g., 1.0031415926, 1.1, 1.2, . . . 1.9).

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. DETERMINING

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), rendering into electronic format or digital representation, ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing, averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

The term "determining" may include "calculating". The term "calculating" should be understood to include performing one or more calculations. Calculating may include computing, processing, and/or deriving. Calculating may be performed by a computing device. For example, calculating a thing may include applying an algorithm to data by a computer processor and generating the thing as an output of the processor.

The term "determining" may include "referencing". The term "referencing" should be understood to include making one or more reference, e.g., to a thing. Referencing may include querying, accessing, selecting, choosing, reading, and/or looking-up. The act of referencing may be performed by a computing device. For example, referencing a thing may include reading a memory location in which the thing is stored by a processor.

The term "determining" may include "receiving". For example, receiving a thing may include taking in the thing. In some embodiments, receiving may include acts performed to take in a thing, such as operating a network interface through which the thing is taken in. In some embodiments, receiving may be performed without acts performed to take in the thing, such as in a direct memory write or a hard wired circuit. Receiving a thing may include receiving a thing from a remote source that may have calculated the thing.

III. FORMS OF SENTENCES

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. In some embodiments, such a plurality of computer-based devices may operate together to perform one step of a process such as is common in grid computing systems. In some embodiments, such a plurality of computer-based devices may operate provide added functionality to one another so that the plurality may operate to perform one step of a process such as is common in cloud computing systems. (Conversely, a single computer-based device may be substituted with multiple computer-based devices operating in cooperation with one another. For example, a single computing device may be substituted with a server and a workstation in communication with one another over the internet) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. DISCLOSED EXAMPLES AND TERMINOLOGY ARE NOT LIMITING

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. § 1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed invention is widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims that recite anything other than a statutory class shall be interpreted to recite purposes, benefits and possible uses of the claimed invention, and such preambles shall not be construed to limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. Devices are in communication with one another if they are capable of at least one-way communication with one another. For example, a first device is in communication with a second device if the first device is capable of transmitting information to the second device. Similarly, the second device is in communication with the first device if the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. COMPUTING

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

The term "compute" shall mean to determine using a processor in accordance with a software algorithm.

A "processor" means one or more microprocessors, central processing units (CPUs), computing devices, microcontrollers, digital signal processors, graphics processing units (GPUs) or like devices or any combination thereof, regardless of the architecture (e.g., chip-level multiprocessing or multi-core, RISC, CISC, Microprocessor without Interlocked Pipeline Stages, pipelining configuration, simultaneous multithreading, microprocessor with integrated graphics processing unit, GPGPU).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the method.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server but outputs display information to and receives user input information from a local user computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), wireless local area network communication defined by the IEEE 802.11 specifications whether or not they are approved by the WiFi Alliance, SAP, ATP, Bluetooth™, and TCP/IP, TDMA, CDMA, and 3G; and/or (iv) encrypted to ensure privacy or prevent fraud in any of a variety of ways well known in the art.

The term "database" refers to any electronically-stored collection of data that is stored in a retrievable format.

The term "data structure" refers to a database in a hardware machine such as a computer.

The term "network" means a series of points or nodes interconnected by communication paths. For example, a network can include a plurality of computers or communication devices interconnected by one or more wired and/or wireless communication paths. Networks can interconnect with other networks and contain subnetworks.

The term "predetermined" means determined beforehand, e.g., before a present time or a present action. For example, the phrase "displaying a predetermined value" means displaying a value that was determined before the act of displaying.

The term "condition" means (1) a premise upon which the fulfillment of an agreement depends, or (2) something essential to the appearance or occurrence of something else.

The term "transaction" means (1) an exchange or transfer of goods, services, or funds, or (2) a communicative action or activity involving two parties or things that reciprocally affect or influence each other.

Thus a description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel®, Pentium®, or Centrino™, Atom™ or Core™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back in to plaintext. An example of an asymmetric key algorithm is the RSA algorithm.

VI. CONTINUING APPLICATIONS

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, PARAGRAPH 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. DISCLAIMER

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application will be prefaced by the phrase “does not include” or by the phrase “cannot perform”.

IX. INCORPORATION BY REFERENCE

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference. Conversely, the definitions provided in this application should not be used to limit, define, or otherwise construe any term of any document incorporated herein by reference. The definitions set forth explicitly in this application are controlling notwithstanding the description of particular embodiments that may be incompatible with the definition(s).

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. PROSECUTION HISTORY

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. ALTERNATIVE TECHNOLOGIES

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the claims herein.

DETAILED DESCRIPTION OF EXEMPLARY EMBODIMENTS

Some embodiments of the present invention relate to methods and devices for playing electronic video poker and other card games.

Video poker is a well known game that may be played using an electronic device such as a computer with a display, a mobile, hand-held device or with a dedicated, video poker gaming machine, such as a kiosk. In some embodiments, the play of basic video poker is the same whether it is played with a hand held, electronic device, with a computer, through the Internet or with a dedicated gaming machine. Some of the following description is primarily directed to a dedicated, video poker gaming or video lottery machine of the type found in casinos.

To play the game according to some embodiments, the player makes a wager by any suitable means such as by wagering credits, inserting tokens or the like. In some implementations, once the wager is made the machine is prompted for play whereupon the processor for machine randomly selects from data representing a deck of playing cards. In one embodiment, the wager consists of any number of coins.

Referring to the drawings, FIG. 1 shows an electronic device 100 for the game and method according to some embodiments of the present invention. The device 100 may be presented by a video display or plasma display for a gaming machine or on a computer monitor or handheld game display.

In some embodiments, the device 100 includes an electronic video display 105 presenting an example of the layout for the play of the game. Device 100 may be incorporated into any platform such as those currently known in the art. For example, the display 105 may be a touch screen display including data input means 110 to control the game/machine processor 115; however it should be understood that other data input means could be used such as machine buttons, mouse, keyboard or the like.

In some embodiments, the display 105 has locations 120 for the display of the game hand cards 125 during play. During the play of the device 100 and method, cards 125 are displayed in a manner as hereinafter described to play the game method in some embodiments.

Although not shown in FIG. 1, in one embodiment, device 100 and/or display 105 may include a credit meter, as is known on the art, to keep a tally on the gaming credits available for play and means for the player to input a wager and prompt play of the game. For example, the device may include a cash reader or token acceptor by which the player may input the desired wager as well as input means to wager accumulated credits, again as is known in the art.

To provide information to the player, the display 105 may include a touch screen help button which, if touched by the player, prompts the processor 115 to display helpful information to the player. Also included in some embodiments is a cash out button which if touched by the player prompts the processor 115 to operate a pay device which may be a coin hopper device, voucher writer, credit or debit card writer or a program to transfer accumulated credits to the player's established account.

In some embodiments, to enable the player to hold/discard cards 125, each location 120 has associated therewith a hold button. In some embodiments, as is known in the play of video poker, if the player desires to hold a card, he/she touches the corresponding hold button which prompts the processor 115 for the game to retain the display of the held card. Cards which are not held in the initial hand or holding, are replaced with replacement cards to define the final outcome holding. The final holding, as described below, is compared to an established pay table to determine if the player has a winning or losing outcome.

In some embodiments, processor 115 controls display 105 to display a pay table which lists winning outcomes and the pay for each. Data corresponding to winning combinations and the pay or award for each may be stored in a second data structure 130.

In some embodiments, data representing the deck of N cards for play of the game is stored in first data structure 135, such as a digital memory device. Where the deck is a single, standard deck, N=52 cards. The data may be stored in a serial order, each address representing a playing card of the deck. In some embodiments, the data is stored in a fashion to replicate a shuffled deck of playing cards. For example, when newly shuffled for play, the card data is stored in the first data structure 135 as a sequential string of card data representing cards N.sub.1 N.sub.52. In this example, the cards in the addresses N.sub.1 N.sub.52 are not in any suit or value order but instead are randomized simulating a shuffled deck of cards, with the top card being N.sub.1 and the bottom card being N.sub.52. In some embodiments, a random number generator may be used to randomly select cards for each address. Thus, to the processor 115 and first data structure 135, the data is arranged in a fashion similar to that of a shuffled deck of cards in some embodiments. It should be recognized, that these examples are non-limiting, and as discussed below, other embodiments may include other elements and/or methods.

In some embodiments, the processor 115 controls the display 105 to display a table which describe the inventory data representing cards of the first data structure 135. The table is updated as card data is selected and cards displayed to impart information as to the remaining constituency of the data, i.e. how many of each card are left in the inventory.

A method of the play and the device 100 for an electronic poker game will now be described.

Figure 2A:
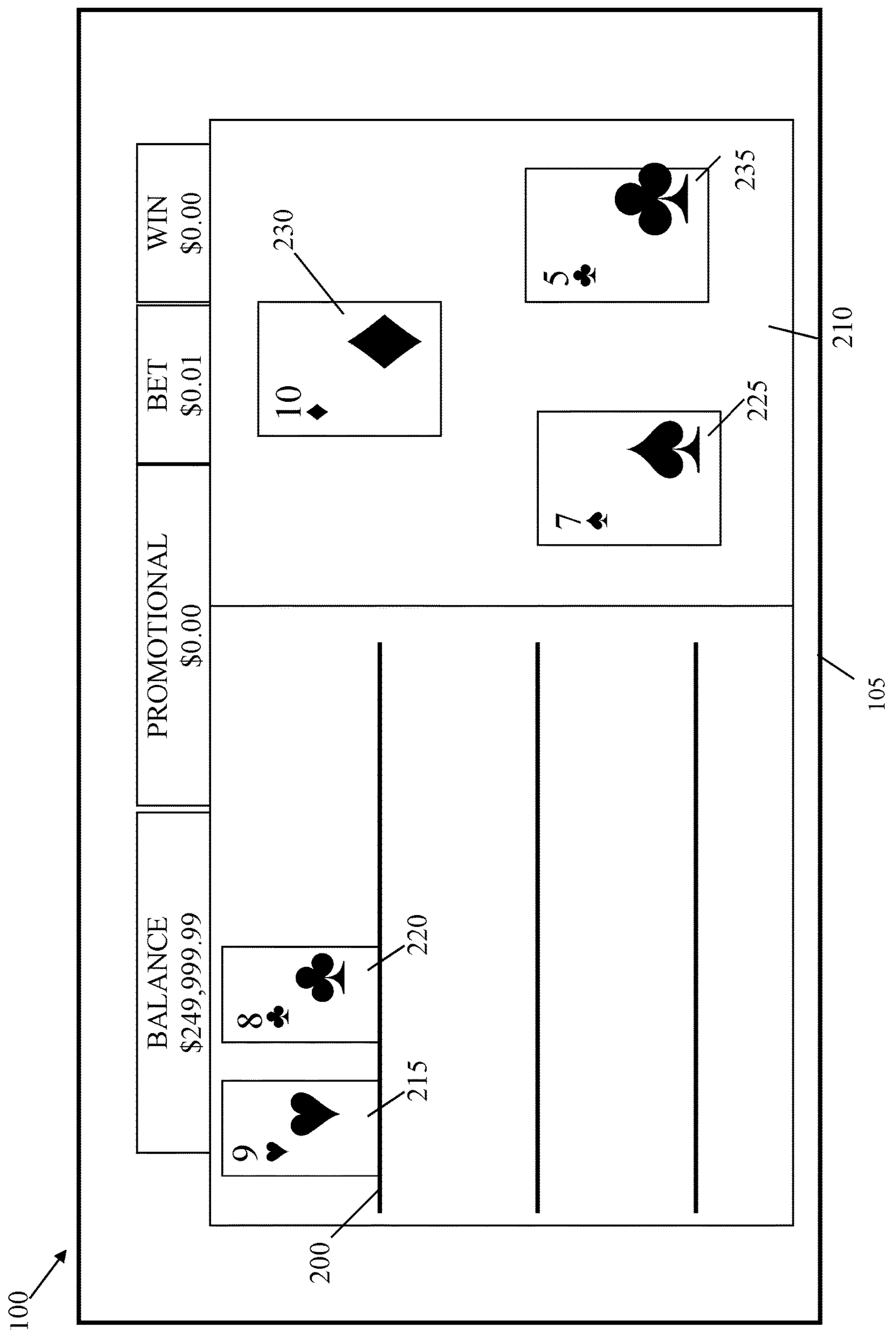
FIGS. 2*a*-2*d* shows an embodiment of a processor controlled display of a video poker game.

Referring to FIG. 2*a*, display 105 shows the start of a poker game. Display 105 shows at least one row of cards that consist of first hand 200. Two cards have already been dealt for hand 200 and three selection cards have been dealt in selection box 210. All of the cards are dealt in a face-up position. The two cards for hand 200 include Nine of Hearts 215 and Eight of Clubs 220. Selection box 210 also has three cards that have been dealt face-up. These three cards are: Seven of Spade 225, Ten of Diamonds 230 and Five of Clubs 235. While FIGS. 2*a*-2*d* illustrate a poker game where two cards are given for the initial hand, it is possible for any number of cards (or no cards) to be dealt for the initial hand. Likewise, the number of selection cards may be dealt into selection box 110.

Figure 3A:
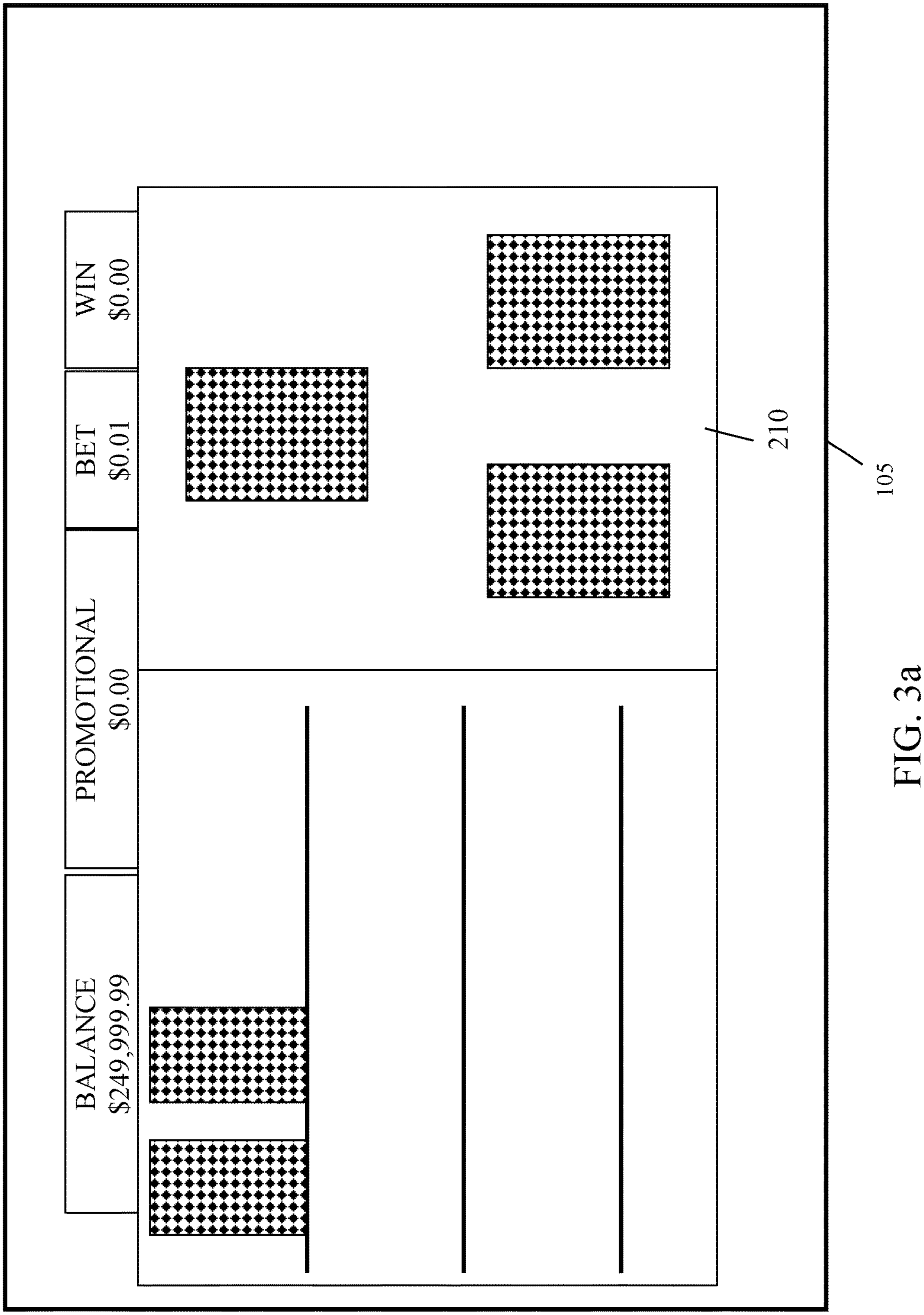
FIG. 3*a*-3*b* shows an embodiment of a processor controlled display of a video poker game.
Figure 3B:
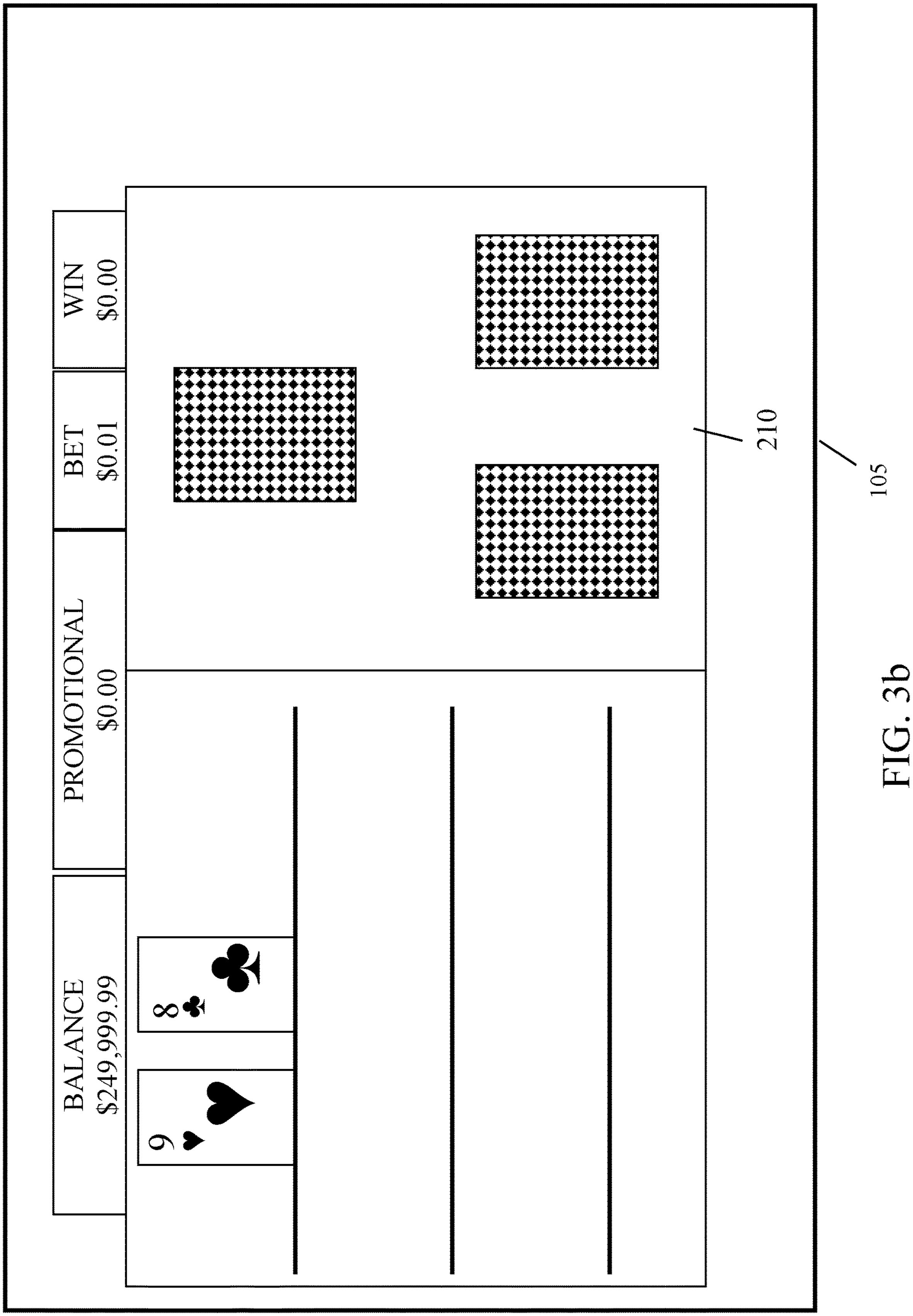

Although the illustrated embodiment of FIG. 2*a* shows all five of the cards being dealt initially in a face-up position, another embodiment (as shown in FIG. 3*a*) may have all of the cards dealt initially in a face-down position. In one embodiment, the all of the dealt cards are exposed simultaneously at a later time. For example, the player may click a command to begin the game. The act of initiating the game may trigger all of the dealt cards to be exposed simultaneously and automatically. In yet another embodiment, the player may manually expose each card one at a time, such as clicking on a card to expose it. In yet another embodiment, some of the cards are dealt facing up and some other cards are dealt facing down. For example, as shown in FIG. 3*b*, the cards in the row for hand 300 may be dealt facing up, whereas the cards that are dealt in selection box 210 are dealt facing down.

Figure 2B:
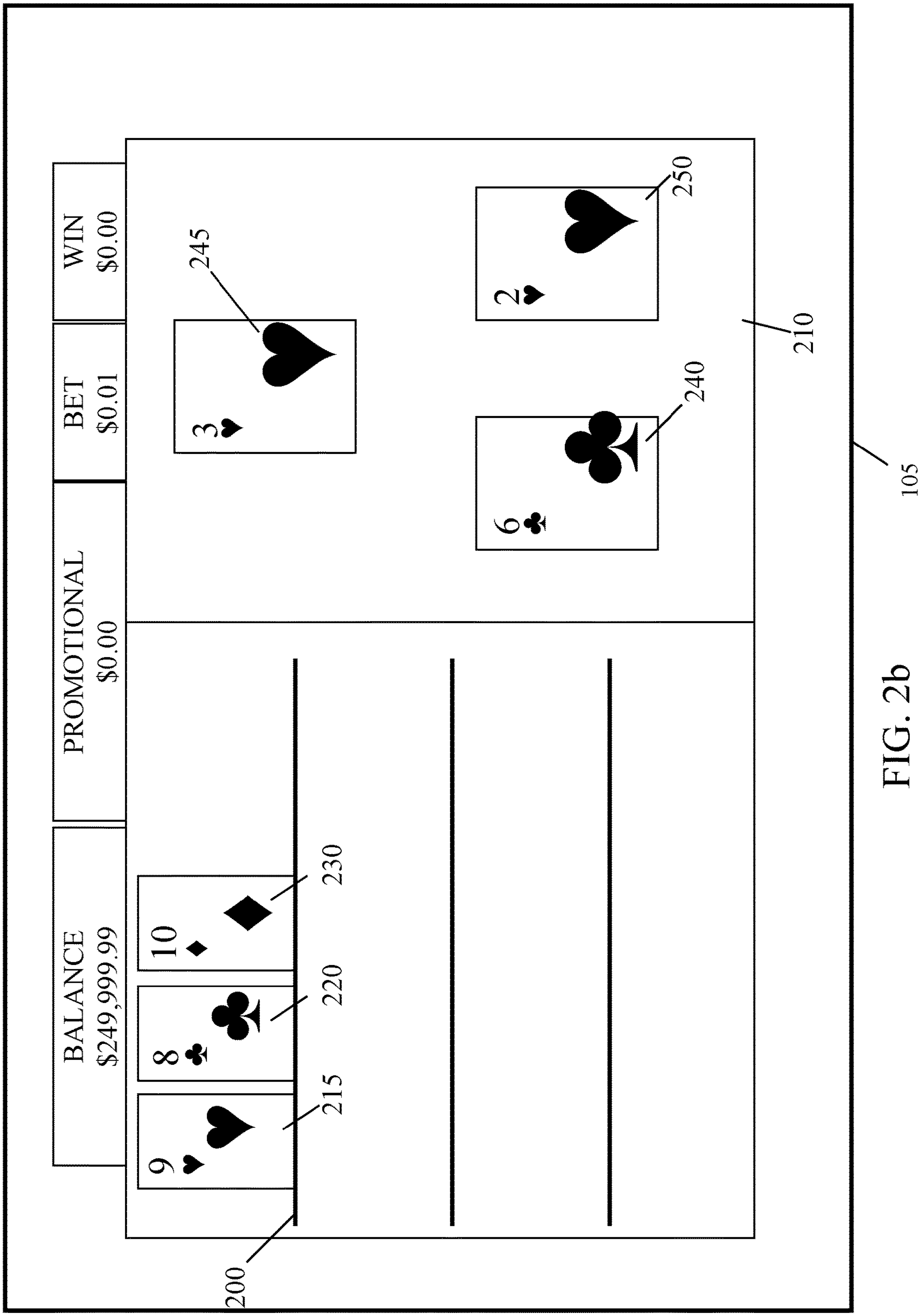

Referring now to FIGS. 2*a* and 2*b*, given the composition of poker hand 200, the player would likely select Ten of Diamonds 230. Upon selection of card 230, this card appears alongside cards 215 and 220 in poker hand 200. The remaining unselected cards 225 and 235 are discarded, and a new set of cards 240, 245, 255 are dealt in selection box 210.

In the preferred embodiment, the unselected cards are discarded and not returned to the deck of cards. However, in another embodiment, the unselected cards may be returned to the deck of hands. In yet another embodiment, the unselected cards 225 and 235 remain in selection box 210, even after the player has selected selection card 230. Only one new selection card is dealt in selection box 210 in order to replace the card that was chosen. The player then selects among this newly dealt card and the two remaining cards 225 and 235. As shown in FIG. 2*b*, the new set of cards includes: Six of Clubs 240, Three of Hearts 245 and Two of Hearts 255. These three cards also are dealt in a position that is facing up.

In another embodiment, the player is permitted to selected more than one card from selection box 210. For example, the player may select two cards before triggering a new set of cards to be dealt in selection box 210.

Figure 2C:
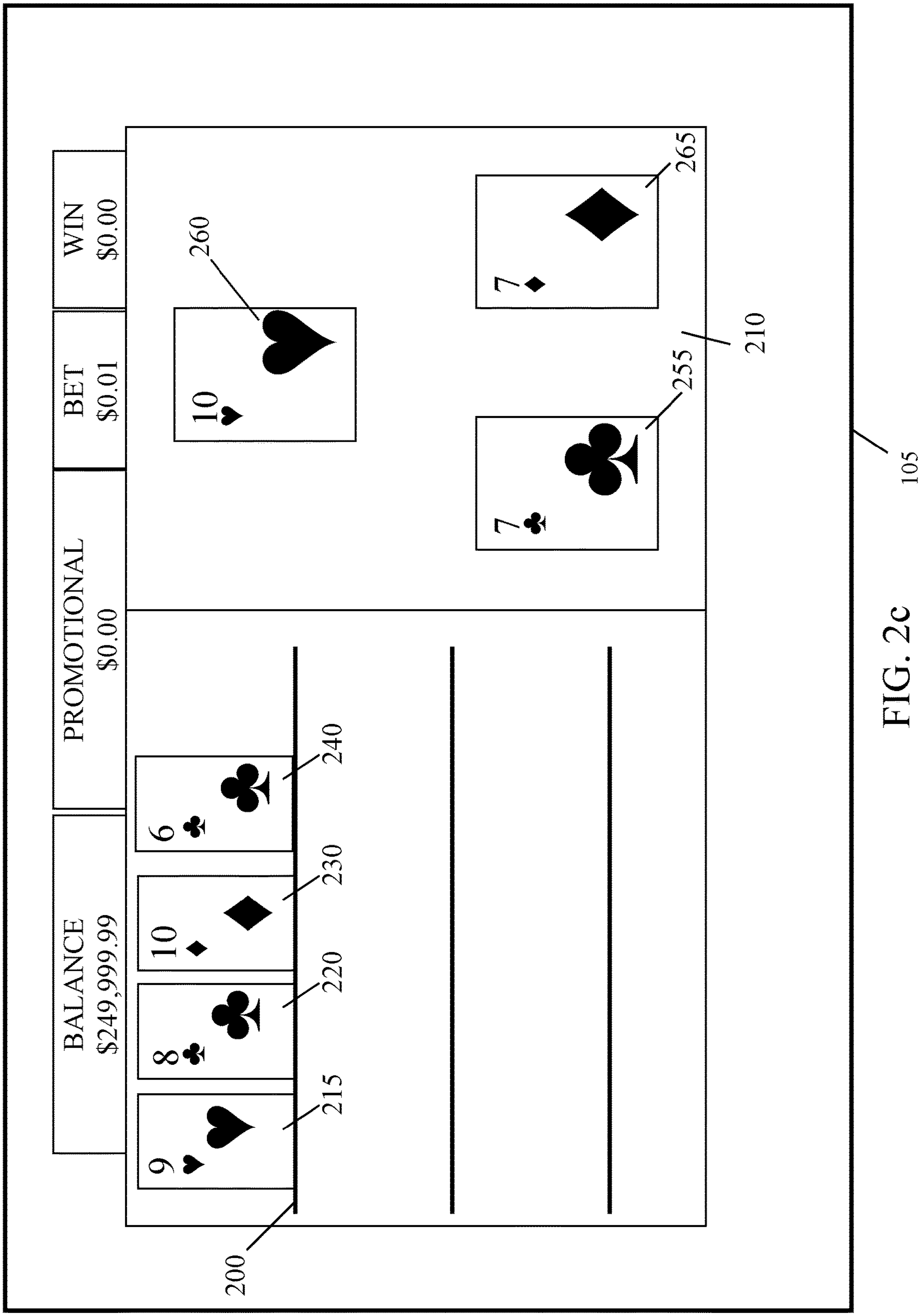

Referring back to FIGS. 2*b* and 2*c*, the player continues playing the poker game and selects Six of Clubs 240 for poker hand 200. Card 240 appears in the row for hand 200. The remaining unselected cards 245 and 250 are discarded, and a new set of cards 255, 260, 265 are dealt in selection box 210, as shown in FIG. 2*c*. These three new cards are: Seven of Clubs 255, Ten of Hearts 260, Seven of Diamonds 265.

Figure 2D:
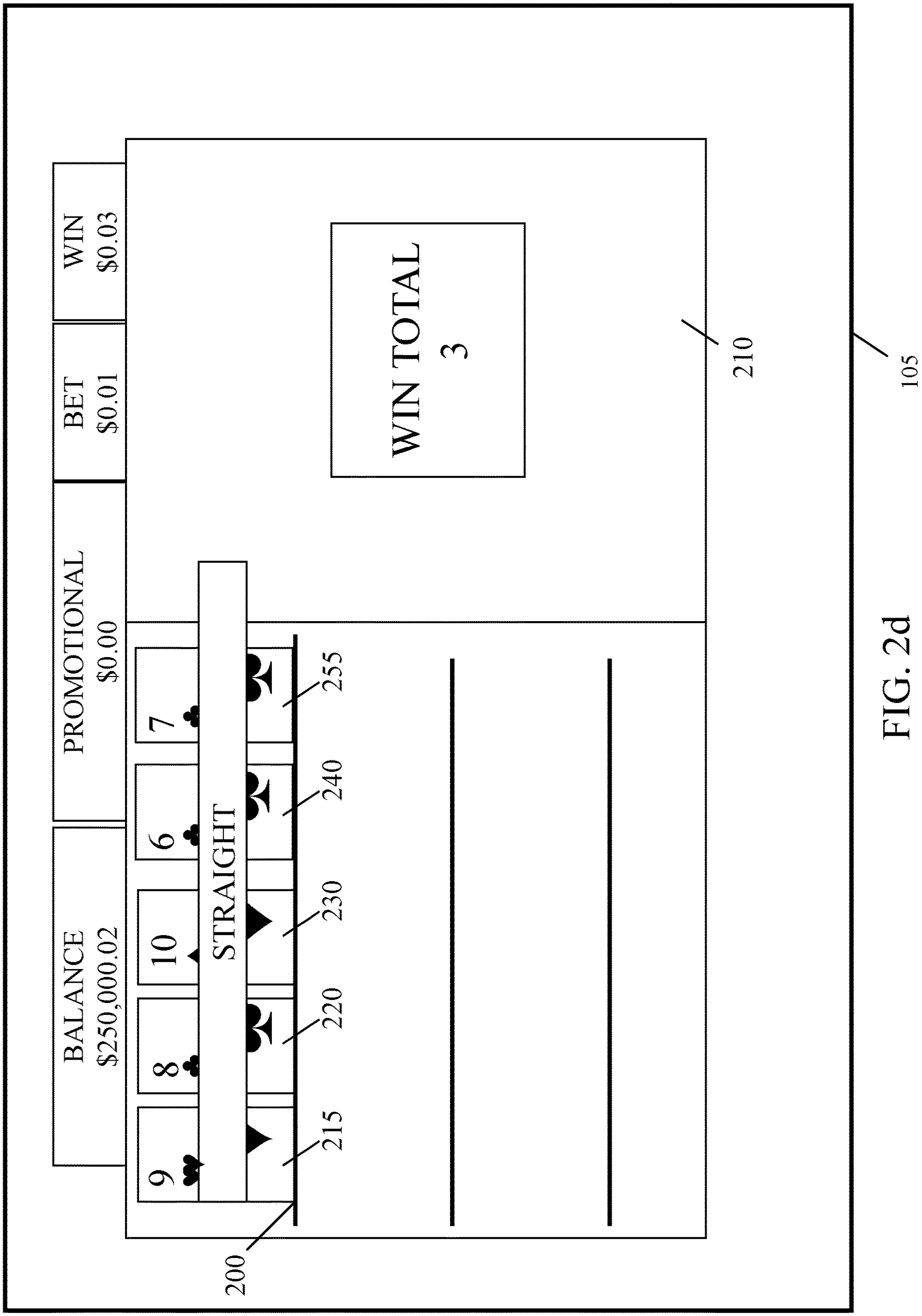

The player then continue playing the poker game and chooses a final card to complete poker hand 200. As shown in FIGS. 2*c* and 2*d*, the player selects Seven of Clubs 255. This card 255 appears along side previously selected cards 230 and 240, and remaining cards 260 and 265 are discarded.

As shown in FIG. 2*d*, once poker hand 200 has been completed, the value of poker hand 200 is computed. A type of win might be displayed over the selected cards, such as notion for "Straight", "Full House", Four of a Kind", "Royal Flush", or any other relevant notation.

In one embodiment, the amount paid to the player is based on a payout table. The payout table may change based on the cards in the hand. In one embodiment, the payout table may change based on the location of the poker game.

In the preferred embodiment, the player may wager money on the card game and receive a pre-determined amount of money back if one or more of the player's completed hands meets a pre-determined poker hand value. In this way, it is possible that the player could lose money on one or more hands and make money on one or more of the hands, or lose money on all of the hands, or make money on all of the hands.

Preferably, the game is played with a single fifty-two card deck (not counting the duplicated cards), although there are several alternative embodiments. One possible embodiment would be to use multiple decks in which a single fifty-two card deck is used for the first hand 200 and then a second hand uses a second fifty-two card deck.

Although the example illustrated in FIGS. 2*a*-2*d* show a single hand in the poker game, in other embodiments, it is possible to implement the poker game with two or more hands. With more than one hand, the poker hand value of all of the hands are determined, and the method is complete, after all hands have been completed.

Figure 4:
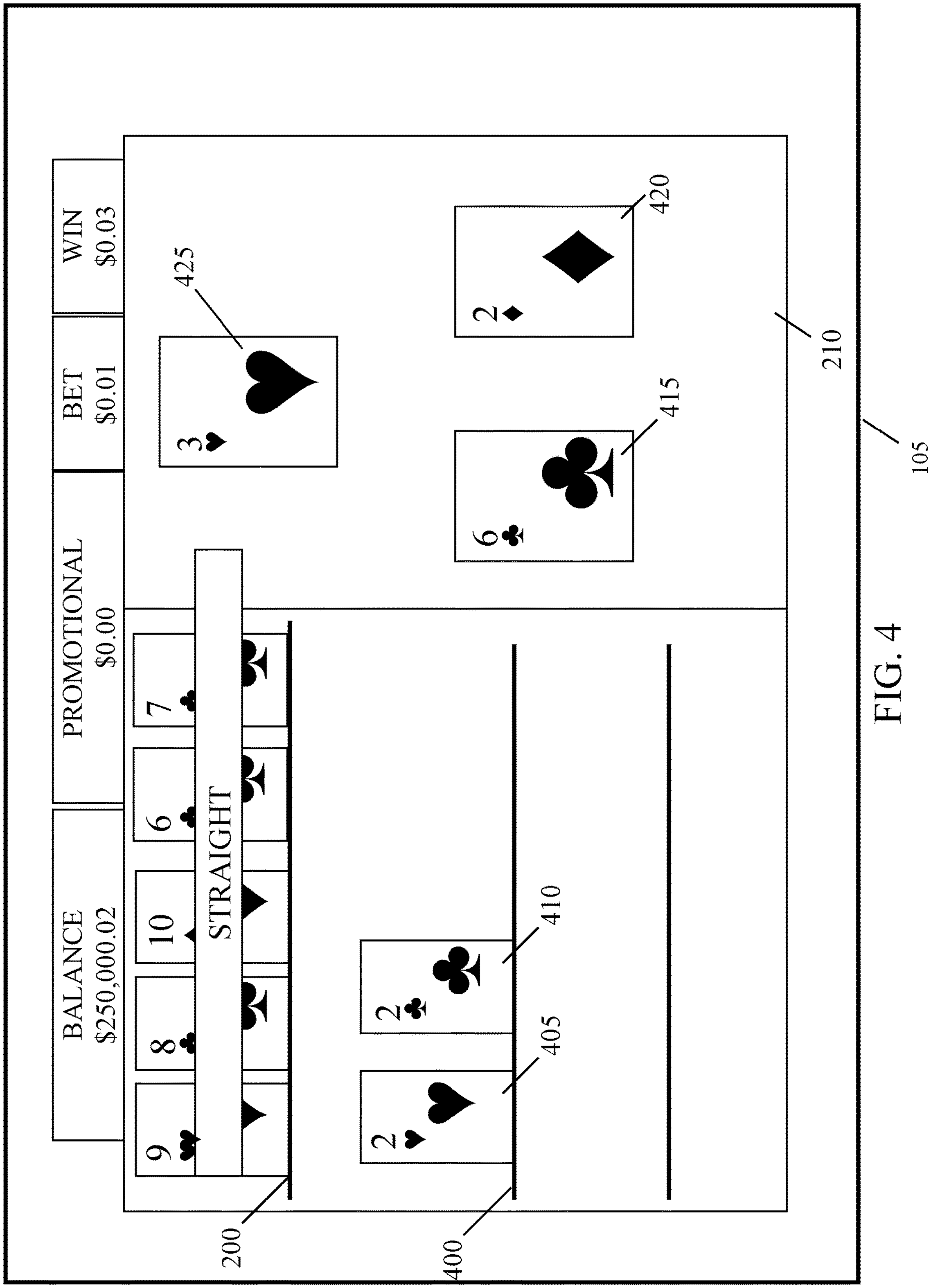
FIG. 4. shows an embodiment of a processor controlled display of a video poker game.
Figure 5A:
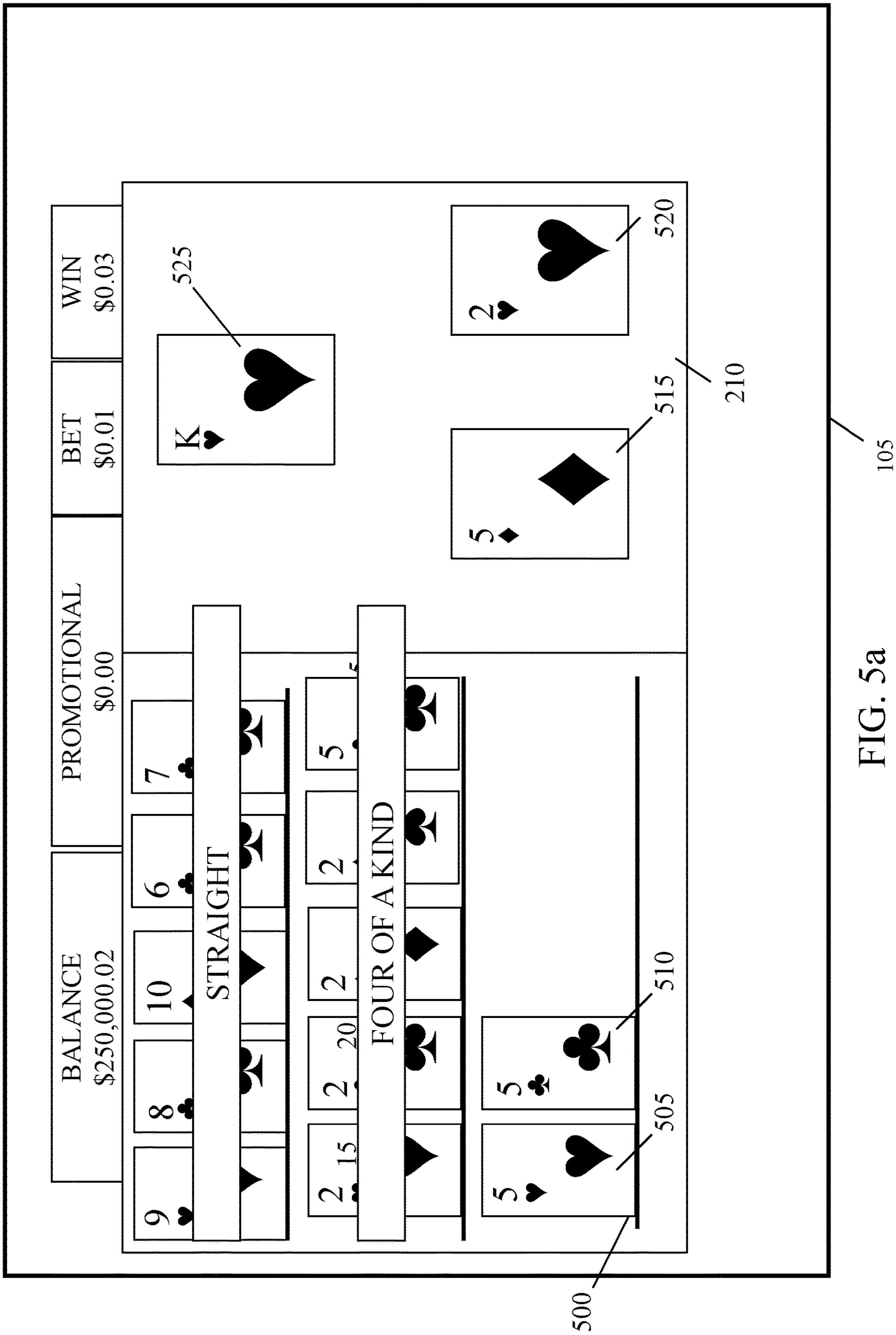
FIGS. 5*a*-5*b*. shows an embodiment of a processor controlled display of a video poker game.
Figure 5B:
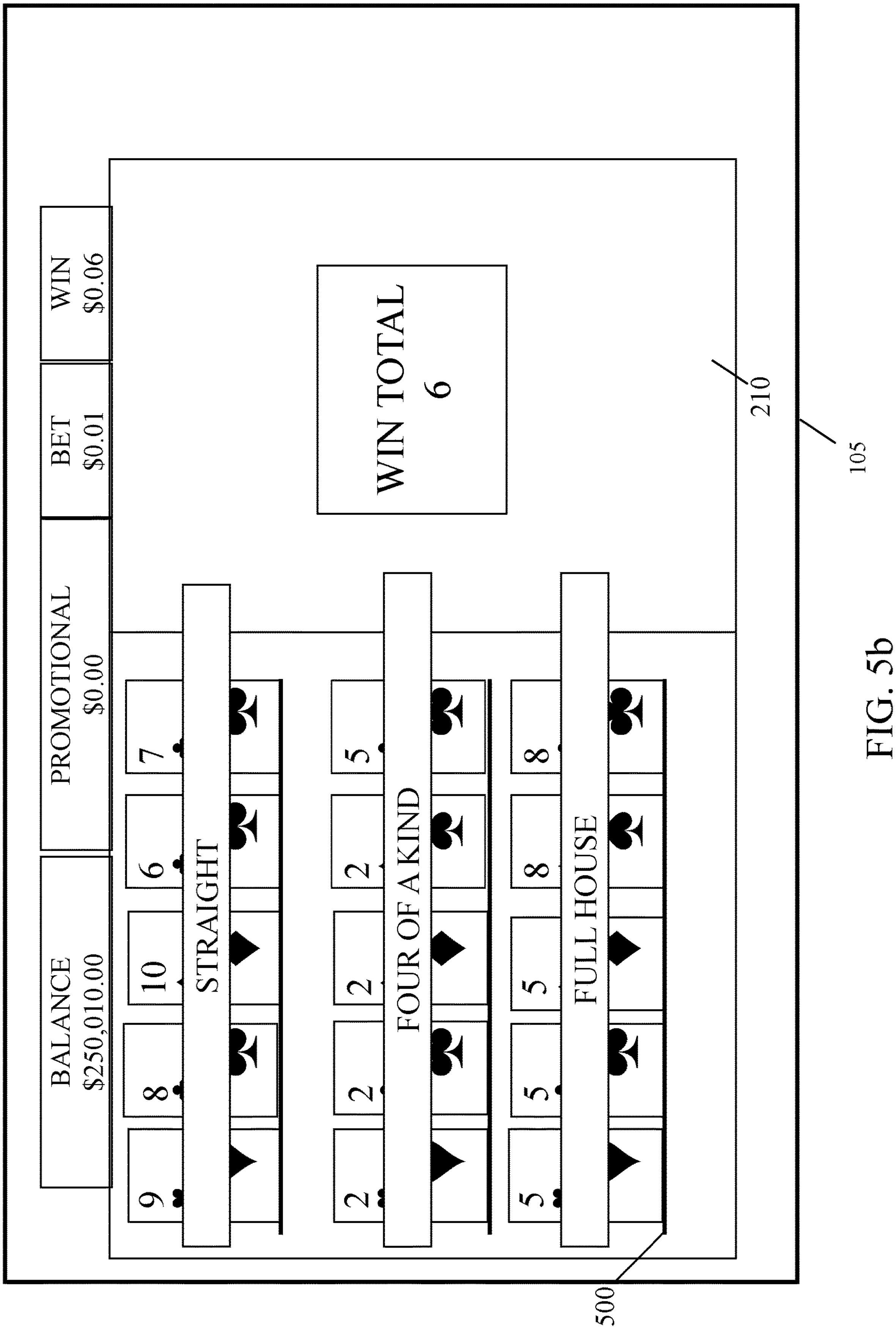

FIGS. 4, 5*a*, 5*b* illustrate the poker game being played with more than one hand. As shown in FIG. 4, once hand 200 has completed, second hand 400 appears with two cards that are dealt facing up. These two cards are: Two of Hearts 405 and Two of Clubs 410. Three selection cards also appear in selection box 210 in the face-up position. These three selection cards are: Six of Clubs 415, Two of Diamonds 420 and Three of Hearts 425. Using a method similar to that described for FIGS. 2*a*-2*d*, the player then selects cards to complete second hand 400.

In one embodiment, the poker game also consists of a third hand. As shown in FIG. 5*a*, after the completion of second hand 400, third hand 500 appears with two cards that are dealt facing up. These two cards are: Five of Hearts 505 and Five of Clubs 510. Three selection cards appears in selection box 210 in the face-up position. These three selection cards are: Five of Diamonds 515, Two of Hearts 520 and King of Hearts 525. Again, using a method similar to that described for FIGS. 2*a*-2*d*, the player selects cards to complete third hand 500, as shown in FIG. 5*b*.

As described above, in one embodiment, hands 200, 400 and 500 are played using the same deck of cards. In another embodiment, each of hands 200, 400 and 500 are played with a new deck of cards. Both a standard deck of cards, or a non-standard deck of cards (e.g., jokers, deuces wild, etc. . . . ) may be used in the embodiments.

Although FIGS. 2*a*-2*d*, 4, 5*a*, 5*b* illustrate poker hands 200, 400 and 500 as being completed with five cards, it should be understood that more than five cards could be used to obtain a poker hand, such as in the poker game of 7-card stud. In another embodiment, less than five cards may be used to obtain the poker hand, such as three or four card poker.

Furthermore, although FIGS. 2*a*-2*d*, 4, 5*a*, 5*b* illustrate each of hands 200, 400 and 500 being played in succession of each other, it also is possible to implement the poker game with each of hands 200, 400 and 500 being played simultaneously.

Figure 6A:
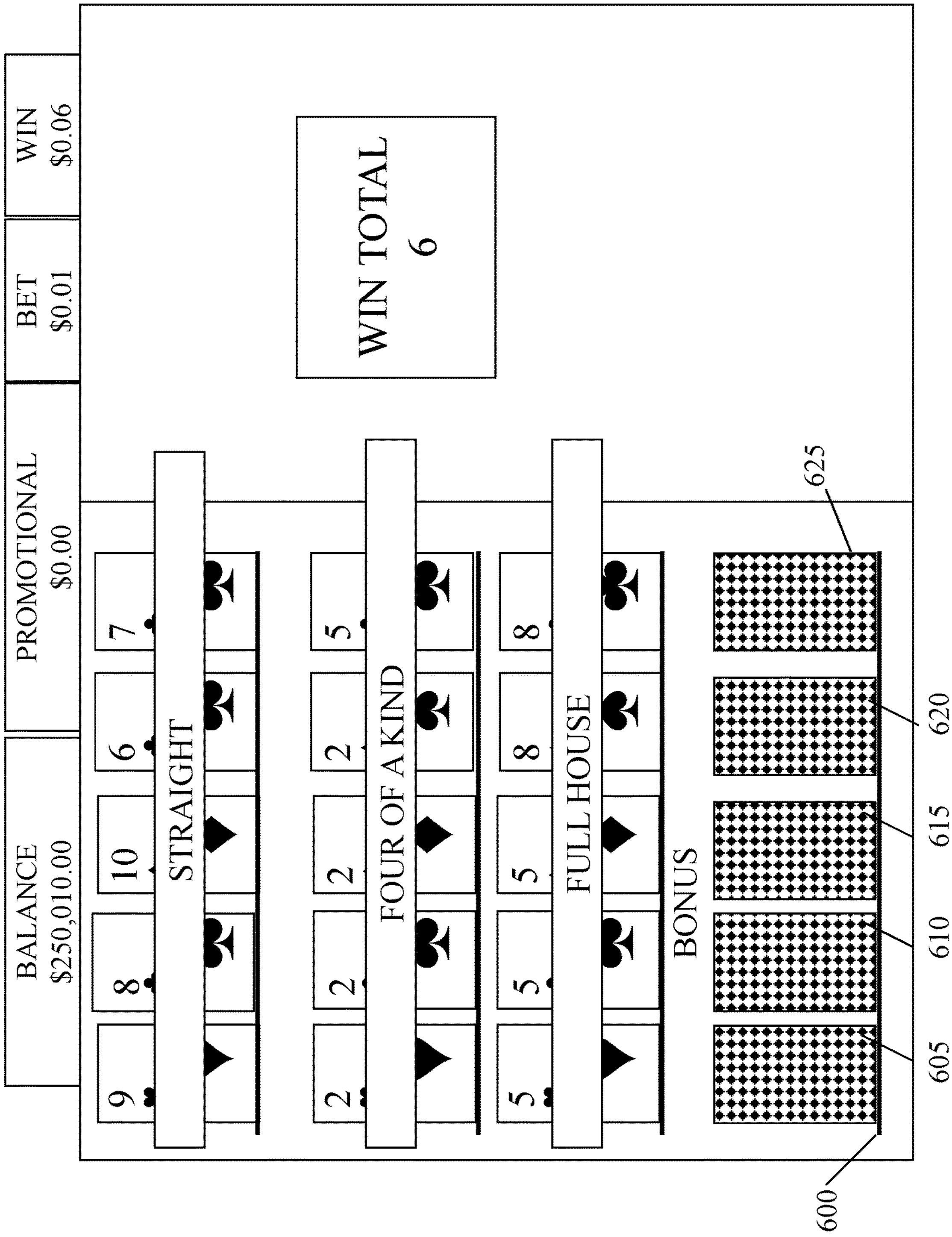
FIG. 6*a*-6*c*. shows an embodiment of a processor controlled display of a bonus hand of a video poker game.
Figure 6B:
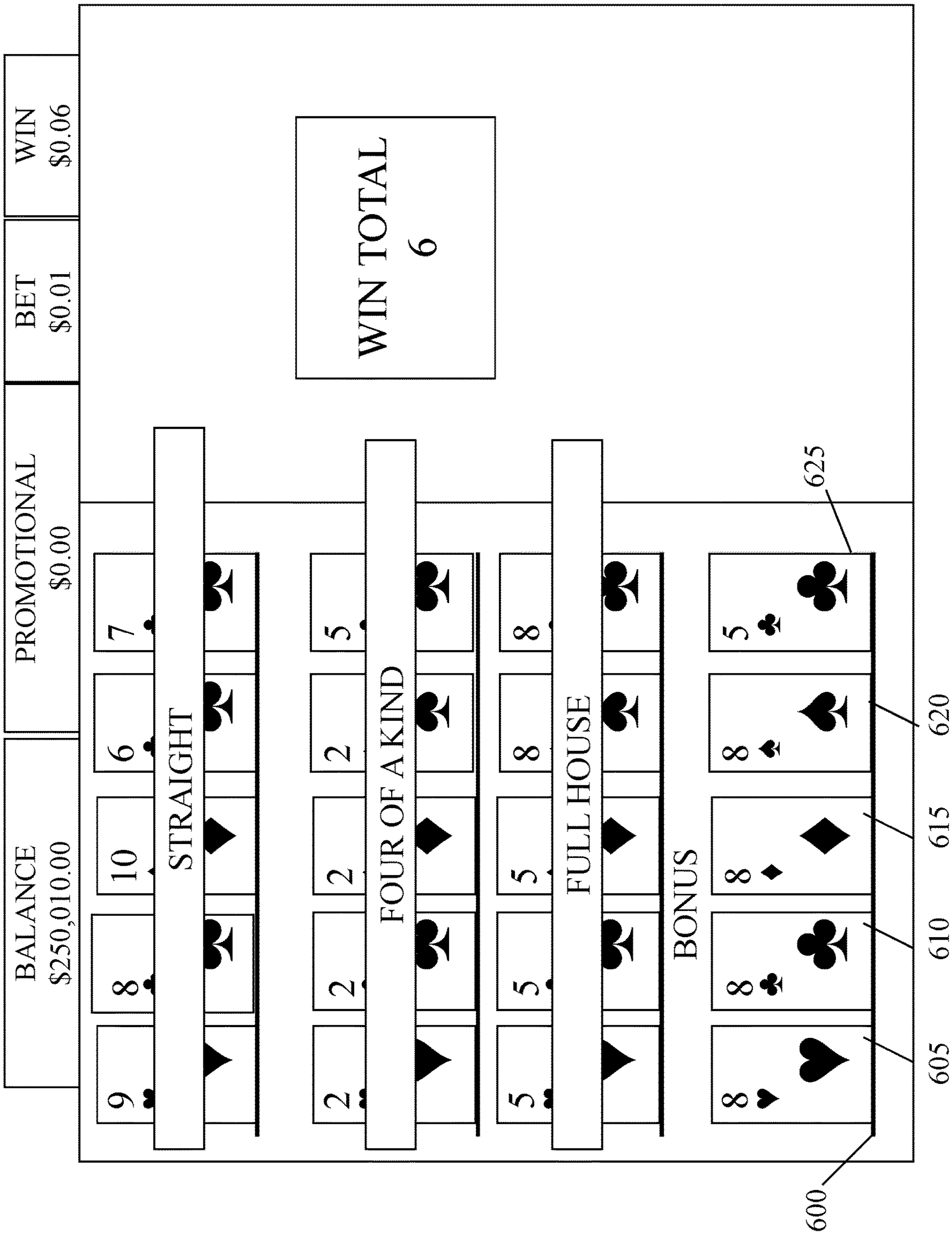
Figure 6C:
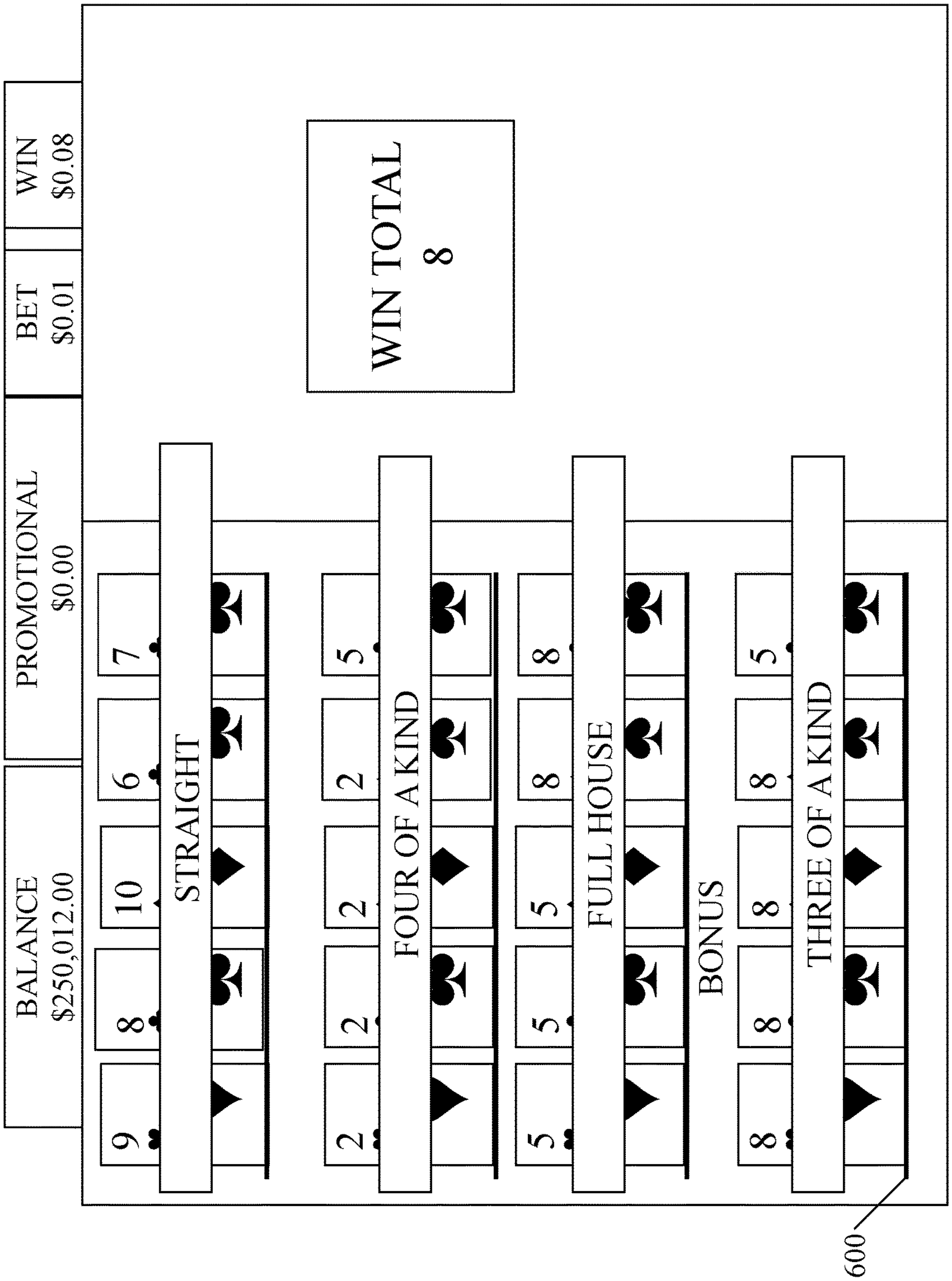

Referring now to FIGS. 6*a*-6*c*, another embodiment may provide the player with a bonus hand 600, which is played after all of the hands within the poker game have been completed. The bonus hand 600 is in the form of a single five-card poker hand with no re-draws. However, in another embodiment, the bonus hand 600 is a seven-card poker hand.

Five cards 605, 610, 615, 620, 625 of the bonus hand 600 are preferably dealt face-down, and not revealed until after poker hands 200, 400 and 500 have been completed. As shown in FIG. 6*a*, the cards 605, 610, 615, 620, 625 of bonus hand 600 are shown facing down. Upon completion of all hands of the poker game, the player has the option of participating in a bonus hand. If the player agrees to play the bonus hand, then as shown in FIG. 6*b*, cards 605, 610, 615, 620, 625 of bonus hand 600 are exposed, thereby showing Eight of Hearts 605, Eight of Clubs 610, Eight of Diamonds 615, Eight of Spades 620 and Five of Clubs 625.

As shown in FIG. 6*c*, a value of bonus hand 600 is determined. The player can then preferably be paid a pre-determined amount of money based on the value of bonus hand 600. This can turn out to be a significant additional compensation bonus for a player playing prior multiple-draw poker games because no such additional bonus poker hand has been previously provided.

Referring now to FIG. 6*c*, this three-of-a-kind hand could then receive a jackpot payment or another predetermined bonus amount regardless of the outcome of poker hand 200. Therefore, it is conceivable that the player could lose money on one or more of the poker hands and still make a significant amount of money on bonus hand 600, or win money on all of the poker hand(s) and also make bonus money on bonus hand 600.

Any of the winnings described above may be subject to tax liabilities as governed by the jurisdiction in which the game is being played. In at least one embodiment, the poker game may require the player to input various identification or biometric information, as described in Appl. Ser. No. 61/921,409 and U.S. Pat. No. 8,210,931, which are incorporated entirely by reference, in order to determine the player's tax liability.

Moreover, any of the games described may be implement in any other card game, besides poker. Such other card games are described in U.S. Pub. No. 20100105459 (App. Ser. No. 12/259,330), which is incorporated entirely by reference herein.

Additional Embodiments

A. A method of playing a poker game comprising: receiving, via a processor from a remote device, a wager from a player for a hand, in which the processor and the remote device are in electronic communication over a network;

displaying on a display, via the processor, to the player at least five cards that are dealt from a deck of cards, in which the at least five cards comprise: at least two cards for the hand that are dealt face up; a first set of selection cards that are dealt either entirely face up or entirely face down, in which the first set comprises at least three selection cards; receiving, via the processor, a request to select a first selection card from the first set of selection cards; adding, via the processor, the first selection card to the hand, wherein the first selection card is displayed face up; removing, via the processor, any selection cards that are not selected from the display and displaying on the display a second set of selection cards that are dealt either entirely face up or entirely face down; receiving, via the processor, a request to select a second selection card from the second set of selection cards; adding, via the processor, the second selection card to the hand, wherein adding the selection card includes displaying the card face up; in response to selection of the second selection card, removing, via the processor, any unselected selection cards from the deck of cards and displaying to the player to the player a third set of selection cards dealt from the deck of cards; receiving, via the processor, a request to select a third selection card from the third set of selection cards; adding, via the processor, the third selection card to the hand, wherein adding the selection card includes displaying the card face up; and determining, via the processor, a ranking for the player's hand and paying the player an amount based on the ranking.

A.1. The method of claim A, in which the poker game comprises one or more hands.

A.2. The method of claim A, in which each wager is between one and five coins, tokens or credits.

A.3. The method of claim A, in which the amount paid to the player is based on a payout table.

A.3.1. The method of claim A.3., in which the payout table changes based on the cards in the hand.

A.4. The method of claim A, in which the poker game is played electronically.

A.5. The method of claim A, in which the poker game is played on a stand-alone kiosk.

A.6. The method of claim A, in which the poker game is played using a mobile gaming device.

A.7. The method of claim A, in which the poker game is being played on a device that is remote to the processor.

A.8. The method of claim A, in which the poker game is played using a standard deck of fifty-two playing cards.

A.9. The method of claim A, in which the poker game is played using a non-standard deck of cards that includes a joker card.

A.10. The method of claim A, in which the poker game is played using multiple decks of playing cards.

A.11. The method of claim A, in which the poker game comprises a first hand and a second hand, in which the first hand and the second hand draw from different decks of playing cards.

A.12. The method of claim A, wherein the amount paid is zero.

A.13. An apparatus comprising: a processor; and a memory, in which the memory includes instruction which, when executed by the processor, direct the processor to: receive a wager from a player for a hand; display on a display to the player at least five cards that are dealt from a deck of cards, in which the at least five cards comprise: at least two cards for the hand that are dealt face up; and a first set of selection cards that are dealt either entirely face up or entirely face down, in which the first set comprises at least three selection cards; receive a request to select a first selection card from the first set of selection cards; add the first selection card to the hand, wherein the first selection card is displayed face up; remove any selection cards that are not selected from the display and displaying on the display a second set of selection cards that are dealt either entirely face up or entirely face down; receive a request to select a second selection card from the second set of selection cards; add the second selection card to the hand, wherein adding the selection card includes displaying the card face up; in response to selection of the second selection card, remove any unselected selection cards from the deck of cards and displaying to the player to the player a third set of selection cards dealt from the deck of cards; receive a request to select a third selection card from the third set of selection cards; add the third selection card to the hand, wherein adding the selection card includes displaying the card face up; and determine a ranking for the player's hand and paying the player an amount based on the ranking.

A.14. An article of manufacture comprising: a tangible, non-transitory computer-readable medium, in which the computer-readable medium stores instructions which, when executed by a processor, direct the processor to: receive a wager from a player for a hand; display on a display to the player at least five cards that are dealt from a deck of cards, in which the at least five cards comprise: at least two cards for the hand that are dealt face up; and a first set of selection cards that are dealt either entirely face up or entirely face down, in which the first set comprises at least three selection cards; receive a request to select a first selection card from the first set of selection cards; add the first selection card to the hand, wherein the first selection card is displayed face up; remove any selection cards that are not selected from the display and displaying on the display a second set of selection cards that are dealt either entirely face up or entirely face down; receive a request to select a second selection card from the second set of selection cards; add the second selection card to the hand, wherein adding the selection card includes displaying the card face up; in response to selection of the second selection card, remove any unselected selection cards from the deck of cards and displaying to the player to the player a third set of selection cards dealt from the deck of cards; receive a request to select a third selection card from the third set of selection cards; add the third selection card to the hand, wherein adding the selection card includes displaying the card face up; and determine a ranking for the player's hand and paying the player an amount based on the ranking.

Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

INCORPORATION BY REFERENCE

The following patents and patent applications are incorporated by reference herein for all purposes:

U.S. Pat. No. 6,669,198 (Appl. Ser. No. 10/164,165)
Appl. Ser. No. 61/921,409
U.S. Pub. No. 20100105459 (App. Ser. No. 12/259,330)
U.S. Pat. No. 8,210,931 (Appl. Ser. No. 11/871,403)
U.S. Pat. No. 6,579,181
U.S. Pat. No. 6,299,536
U.S. Pat. No. 6,093,103
U.S. Pat. No. 5,941,769
U.S. Pat. No. 7,114,718
US Pub. No. 20050012269
U.S. Pat. No. 4,515,367
U.S. Pat. No. 5,000,453
U.S. Pat. No. 7,137,630
U.S. Pat. No. 7,137,629

The invention claimed is:

1. A method for a player to play a card game on a computing device having a processor, memory, and a display, comprising:

storing, in the memory, in a data structure, representations of a plurality of playing cards having unique serial addresses in the memory;

randomizing the unique serial addresses to simulate shuffling of the plurality of playing cards;

dealing and presenting, on the display, the representations of the plurality of playing cards, forming at least two hands of cards, each hand of cards including shared community cards, wherein the playing cards of the at least two hands of cards are presented in separate rows on the display with a balance, a wager amount, and a win amount and each representation of a playing card is stored at a respective unique serial address in the memory, the processor being configured to render the display by accessing and rendering representations from the respective serial addresses in the memory in the data structure;

executing via the processor the functions of:

setting, by the player, the wager amount concerning an outcome of playing of the card game for the at least two hands of cards;

selecting a first playing card from the plurality of playing cards of the at least two hands of cards;

displaying a table based on examination of inventory data representing cards available for play, the table indicating how many of each card are left in the deck;

determining a ranking for the at least two hands of cards and a payout amount; and transferring the payout amount as credit to an established account of the player.

2. The method of claim 1, wherein representations of two cards for a first of the at least two hands of cards are presented face up and the first playing card are presented face-up, wherein each representation of a card corresponds to card data stored at a unique serial address in the memory in the data structure.

3. The method of claim 2, further comprising:

selecting a first community card from the shared community cards of the first of the at least two hands of cards;

adding the first playing card to the first of the at least two hands of cards; and removing the first playing card from the shared community cards of the first of the at least two hands of cards.

4. The method of claim 3, wherein the first playing card is added to the first of the at least two hands of cards and presented face-up.

5. The method of claim 1, wherein the payout amount is based on the ranking of the at least two hands of cards, and further comprising computing whether the ranking of the at least two hands of cards is above a pre-determined amount; and adding a bonus amount to the payout amount when the ranking is above the pre-determined amount.

6. The method of claim 1, wherein the card game is poker.

7. The method of claim 1, wherein the computing device is a mobile gaming device.

8. The method of claim 1, further comprising:

computing, based on the payout amount, whether the player has a tax liability; determining an identity of the player and a location of the computing device;

determining at least one jurisdiction that governs taxation of the payout amount based on the location of the player; and in response transmitting a tax submission including at least one electronic tax form and an electronic authorization from the player.

9. The method of claim 8, further comprising:

requesting that the player fill out an electronic tax form for each appropriate jurisdiction; and obtaining the electronic authorization from the player.

10. The method of claim 9, wherein the electronic authorization is valid for a predetermined period of time.

11. The method of claim 9, wherein the electronic authorization is valid for a predetermined quantity of games.

12. The method of claim 1, further comprising:

displaying, on the display, a graphical representation of remaining cards in the data structure after each card selection, wherein storing the plurality of playing cards in the data structure comprises using a random number generator to assign the serial address in the data structure of each card, thereby simulating a shuffled deck order in memory, wherein each representation of a card corresponds to card data stored at a unique serial address in the memory in the data structure, wherein the graphical representation of remaining cards updates based on the serial addresses in the data structure associated with the card data.

13. An apparatus for a player to play a card game on a computing device having a processor, memory and a display, the processor is configured to:

store, in the memory, a data structure, representations of a plurality of playing cards having unique serial addresses in the memory;

randomize the unique serial addresses to simulate shuffling of the plurality of playing cards;

deal and present, on the display, the representations of the plurality of playing cards, forming at least two hands of cards, each hand of cards including shared community cards, wherein the playing cards of the at least two hands of cards are presented in separate rows on the display with a balance, a wager amount, and a win amount and each representation of a playing card is stored at a respective unique serial address in the memory, the processor being configured to render the display based on the respective unique serial address of the representations;

set, by the player, the wager amount concerning an outcome of playing of the card game for the at least two hands of cards;

select a first playing card from the playing cards of the at least two hands of cards;

displaying a table based on examination of inventory data representing cards available for play, the table indicating how many of each card are left in the deck;

determine a ranking for the at least two hands of cards, and a payout amount; and transfer the payout amount as credit to an established account of the player.

14. The apparatus of claim 13, wherein the card game is poker and the computing device is a mobile gaming device.

15. The apparatus of claim 14, wherein representations of two cards for a first of the at least two hands of cards are presented face up and the first playing card is presented face-up, and the processor is further configured to:

select a first community card from the shared community cards of the first of the at least two hands of cards;

add the first community card to the first of the at least two hands of cards; and remove the first community card from the shared community cards of the first of the at least two hands of cards, wherein the first community card is added to the first of the at least two hands of cards and is presented face-up.

16. The apparatus of claim 13, wherein the payout amount is based on the ranking of the at least two hands of cards;

the processor is further configured to compute whether the ranking of the at least two hands of cards is above a pre-determined amount; and adding a bonus amount to the payout amount when the ranking is above the pre-determined amount, wherein a poker game is played electronically.

17. The apparatus of claim 13, wherein the processor is configured to:

compute, based on the payout amount, whether the player has a tax liability;

determine an identity of the player and a location of the computing device;

based on the location of the computing device, determine at least one jurisdiction that governs taxation of the payout amount; in response transmit a tax submission, including at least one electronic tax form and an electronic authorization from the player;

request that the player fill out an electronic tax form for each appropriate jurisdiction; and obtain the electronic authorization from the player.

18. The apparatus of claim 17, wherein the electronic authorization is valid for a predetermined period of time.

19. The apparatus of claim 17, wherein the electronic authorization is valid for a predetermined quantity of games.

20. A non-transitory storage medium configured to store instructions which, when executed by at least one processor, perform a method for a player to play a card game on a computing device having a processor, memory, and a display, comprising:

storing, in the memory, in a data structure, representations of a plurality of playing cards having unique serial addresses in the memory;

randomizing the unique serial addresses to simulate shuffling of the plurality of playing cards;

dealing and presenting, on the display, the representations of the plurality of playing cards, forming at least two hands of cards, each hand of cards including shared community cards, wherein the playing cards of the at least two hands of cards are presented in separate rows on the display with a balance, a wager amount, and a win amount and each representation of a playing card is stored at a respective unique serial address in the memory, the processor being configured to render the display based on the respective unique serial address of the representations;

setting, by the player, the wager amount concerning an outcome of playing of the card game for the at least two hands of cards;

selecting a first playing card from the playing cards of the at least two hands of cards;

displaying a table based on examination of inventory data representing cards available for play, the table indicating how many of each card are left in the deck;

determining a ranking for the at least two hands of cards, and a payout amount; and transferring the payout amount as credit to an established account of the player.

* * * * *